S. R. BOWIE.
Improvement in Glass-Blowers' Molds.
No. 129,709.
Patented July 23, 1872.
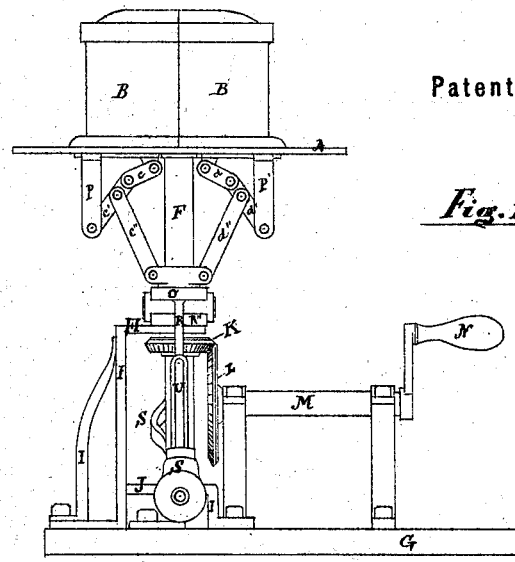
Fig. 1.
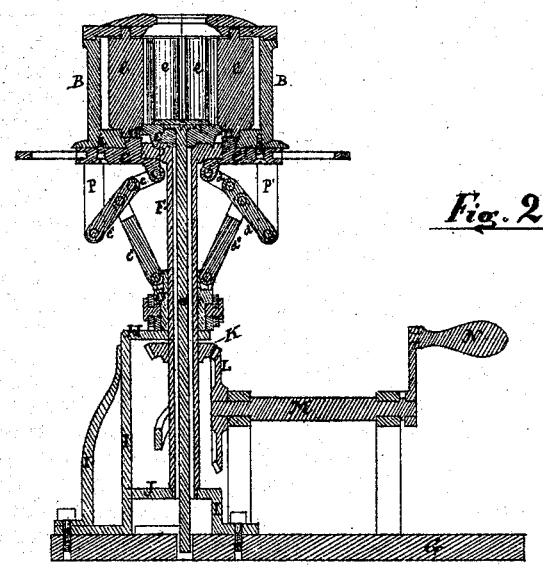
Fig. 2.
Fig. 3.
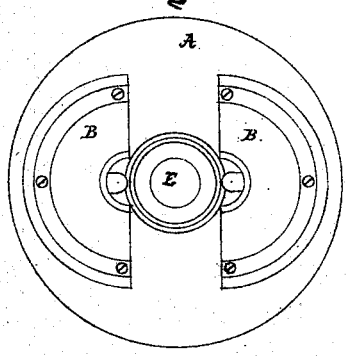
Witnesses:
Samuel Green
Geo. O. Otis
Inventor:
Saml. R. Bowie
by his atty F. P. Hale

UNITED STATES PATENT OFFICE.

SAMUEL R. BOWIE, OF NEW BEDFORD, MASSACHUSETTS, ASSIGNOR TO HIMSELF AND WM. L. LIBBEY & BROTHER, OF SAME PLACE.

IMPROVEMENT IN GLASS-BLOWERS' MOLDS.

Specification forming part of Letters Patent No. 129,709, dated July 23, 1872.

*To all persons to whom these presents may come:*

Be it known that I, SAMUEL R. BOWIE, of New Bedford, in the county of Bristol and State of Massachusetts, have invented certain new and useful Improvements in Glass-Blowers' Molds; and I do hereby declare the same to be fully described in the following specification and represented in the accompanying drawing, of which—

Figure 1 denotes a side elevation of the mold and its operative mechanism; Fig. 2, a vertical and central section of the same. Fig. 3 is a top view of the circular mold-supporting plate and mold, showing the mold as open.

It is a fact well known that in molding articles of glass, wherein the mold is made in two or more sections, a seam or ridge is formed in the articles molded at each joint of the mold. This is very objectionable, and greatly injures or mars the appearance of the molded article. To remedy this defect, or to impart to such molded article a smooth and uniform surface, is the object of my invention.

My invention has special reference to the molding of articles having curved surfaces.

In the said drawing, A denotes a circular plate, upon which the two halves or sections, B B, of the mold are mounted. Each of the said sections is so attached to a slider, C or C', as to be capable of sliding diametrically toward and away from each other, as circumstances may require. D is a centralizing boss or table to receive and support a stationary bottom-former or plate, E, which is provided with a foot or spindle, $o$, that extends down through a hollow standard or sleeve, F, and is stepped in the base-plate G. The said standard or sleeve F, having its upper end securely affixed to the under surface of the plate A, projects downward through a supporting-arm, H, depending from the frame I I, and rests upon a table or shelf, J, of the said frame, which is securely bolted to the base-plate G. K is a beveled gear, which is disposed upon the said hollow sleeve F, and engages with another beveled gear, L, arranged upon the driving-shaft M, the latter being provided with a crank, N, by which rotary motion may be imparted to the said mold.

The mechanism for manipulating or opening and closing the mold is as follows: O is a tubular collar embracing the sleeve F, and so as to be capable of sliding freely up and down thereon. The said collar is connected with the sliders C C', before mentioned, by two series of levers, $c\ c'\ c''\ d\ d'\ d''$, which are formed, connected, and arranged as shown in Figs. 1 and 2, each of the levers $c'\ d'$ being pivoted to a U-shaped support, P or P', depending from the mold-plate on opposite sides, as shown in such figures. R is a bent lever, whose upper bifurcated arms are pivoted to a sliding collar, R', (resting upon a washer, R,'') its lower end being pivoted or connected to a hand-lever, S, the rear of which is pivoted to a standard extending up from the base G. U is a slotted upright, by which the hand-lever is guided in its vertical movements.

The inner surface of the mold or the portion for forming the sides of molded article I make of a series (not limiting myself to the number) of vertical or peripheral rollers, $e\ e$, &c., the axis of each being arranged in a circle concentric with the axis of the stationary bottom-former or the mold-plate A. The forms of such rollers may be various, depending entirely upon the surface or shape of the article to be molded. In the present instance the drawing exhibits a mold to produce an ordinary cylindrical glass jar. Each of the rollers has a compound rotary motion—viz., on its own axis, and on the common axis of the mold—whereby great rapidity of the mold and evenness of the molded glass are attained.

I would remark that if desirable, instead of the rollers, a series of stationary uprights, having the same vertical curvature of the rollers, may be employed, or the rollers and the uprights may alternate; also, that each of the two parts or sections of the mold may be made smooth or with an unbroken surface in the ordinary manner, the revolution of the mold around the glass serving to give an even surface thereto. I do not, however, consider the latter modes as practical as that first mentioned. Furthermore, as a means of rotation, each of these rollers may have a pinion formed on its lower end to engage with a rack formed on the periphery of the stationary bottom-former E; or the said rollers at their lower ends may be so formed as to impinge against the edge of the plate G, so as to be driven by friction therewith, as in the present instance. The said mold and its adjuncts may be made of iron, steel, or any other suitable known material or materials.

In using my improved mold, the stationary bottom-former or plate E is to be placed upon the centralizing-boss D. Next, the glass-blower with a mass of molten or plastic glass upon the end of his pipe sufficient to form the article, deposits such mass upon the central part of the support or bottom-former. The two parts of the mold are next closed. The glass-blower then commences to blow and inflate the glass in the mold in the ordinary manner, rapid rotary motion being imparted to the mold by means of a hand applied to the crank, or by any other suitable motor. A smooth and even surface will be given to the molded article. After the article may have been molded, the mold may be readily opened by raising up the hand-lever, and the article removed from the mold.

Having described my invention, what I claim is as follows:

1. The rotary mold for forming the outer surface of a blown-glass article, when constructed substantially as herein set forth.

2. The combination of a stationary axial bed or bottom-former with the rotary mold or body-former, substantially as and for the purpose set forth.

3. A mold as made with a series of peripheral rollers, as and for the purpose set forth.

4. In combination with a rotating mold made in two sections or parts, B B, as described, mechanism, as specified, for opening and closing the same, as set forth.

5. In combination, with the stationary axial support or bottom-former and the rotary mold or parts B B, mechanism for rotating the latter, substantially as set forth.

SAMUEL R. BOWIE.

Witnesses:
  SAML. PRINCE,
  F. C. HALE.